United States Patent [19]
Morrison

[11] Patent Number: 5,521,625
[45] Date of Patent: May 28, 1996

[54] PROPAGATION-DELAY-TRANSPARENT VIDEO-SIGNAL INTERFACE

[75] Inventor: Robert D. Morrison, Star, Id.

[73] Assignee: Hewlett-Packard Company, Palo Alto, Calif.

[21] Appl. No.: 109,138

[22] Filed: Aug. 19, 1993

[51] Int. Cl.$^6$ .................................................. H04N 1/21
[52] U.S. Cl. .............................................. 347/108; 358/296
[58] Field of Search ................................ 347/237, 247, 347/148; 358/296, 335

[56] References Cited

U.S. PATENT DOCUMENTS 4,814,896  3/1989  Heitzman et al. ...................... 358/335

Primary Examiner—Mark J. Reinhart

[57] ABSTRACT

A propagation-delay-transparent, video-signal interface suitable for use in a laser printer to carry a video signal from a formatter to a laser driver with minimal distortion. The interface includes two transmission paths, one for carrying the video signal produced by the formatter and another for carrying an inverted video signal or complement of the video signal. A differential circuit is included in the interface to determine a difference between the signals transmitted by the two transmission paths so that common-mode noise introduced along the transmission paths is substantially eliminated. The transmission paths include buffers, which restore pulses in the video signal to appropriate digital levels. The differential circuit includes hysteresis circuitry that, in combination with the differential function of the differential circuit, eliminates pulse width distortion of the video signal caused by delays of the buffers. The buffers are formed in pairs on common substrates so that the two transmission paths have nearly identical propagation delays, to further minimize pulse width distortion.

16 Claims, 3 Drawing Sheets

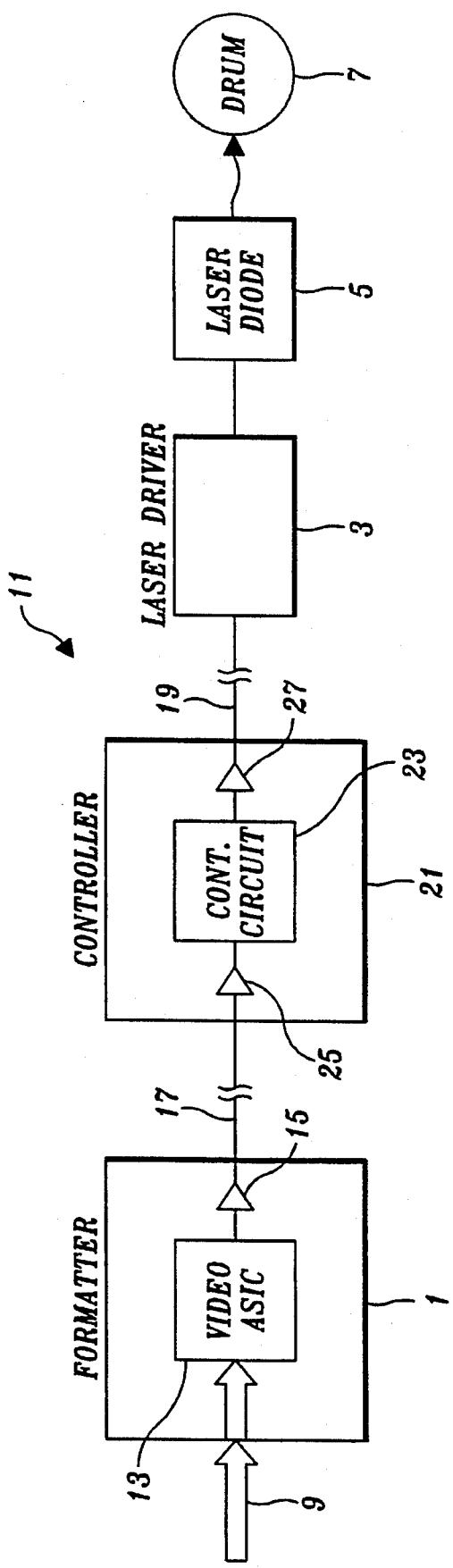
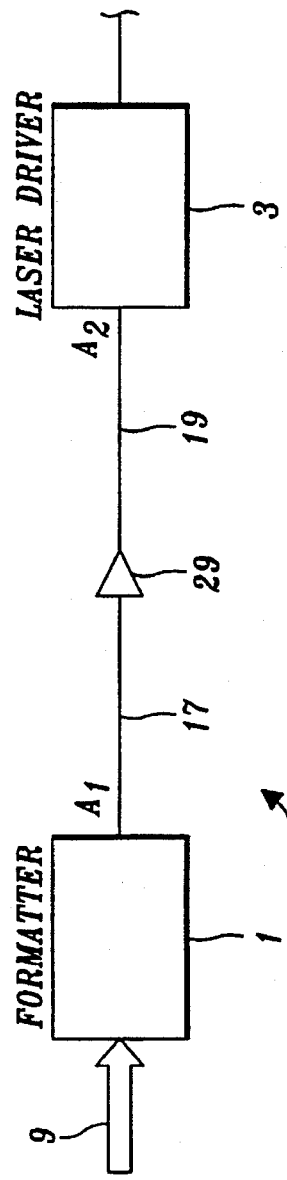
Fig. 1A. PRIOR ART
Fig. 1B. PRIOR ART

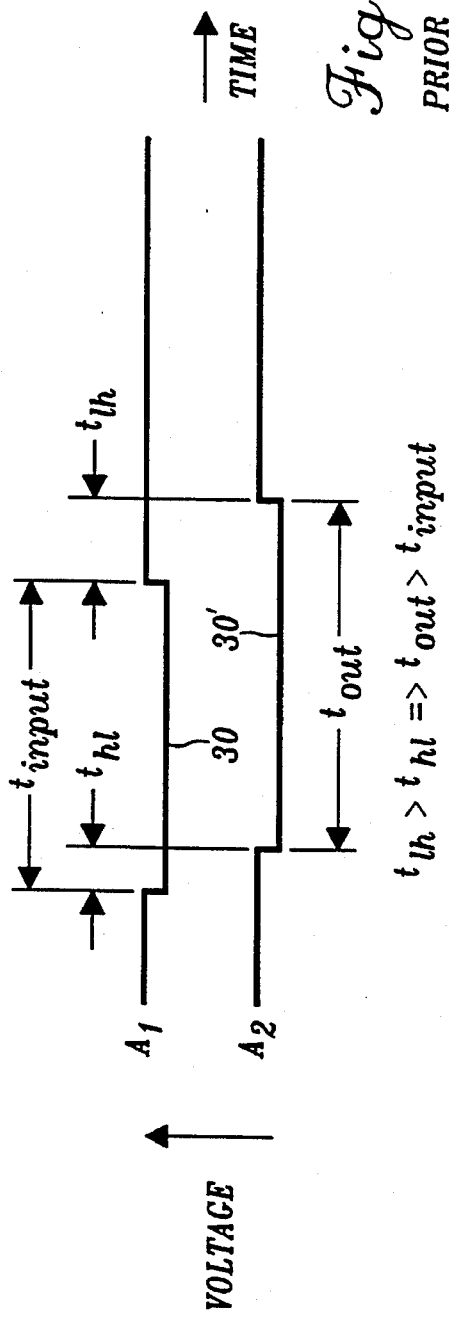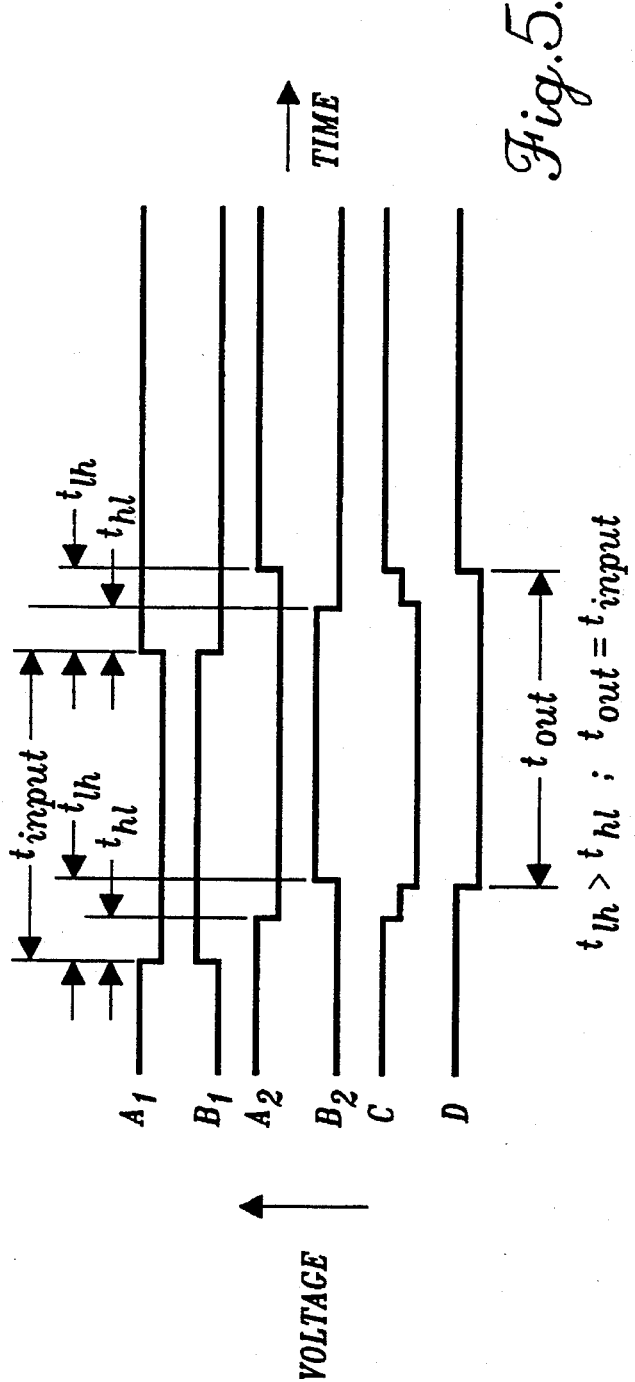

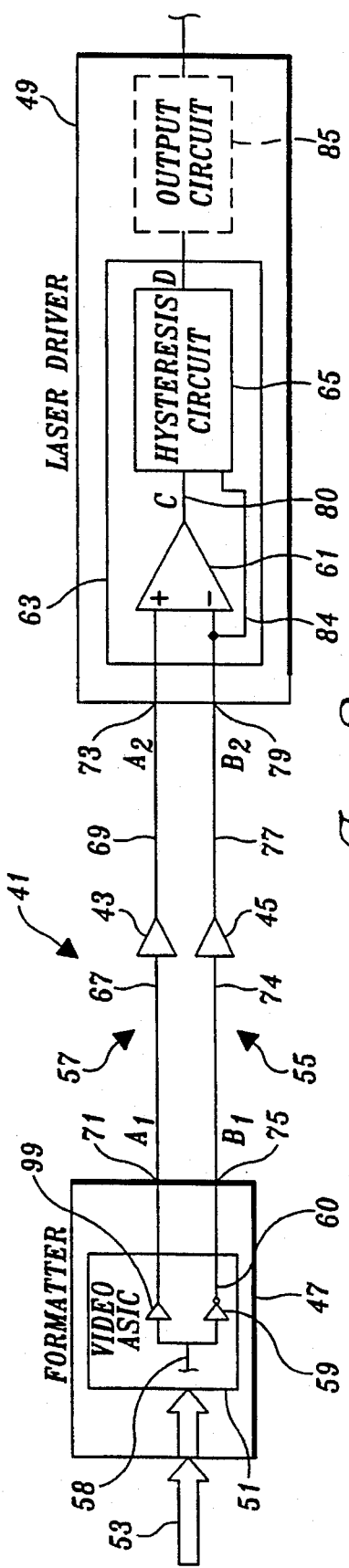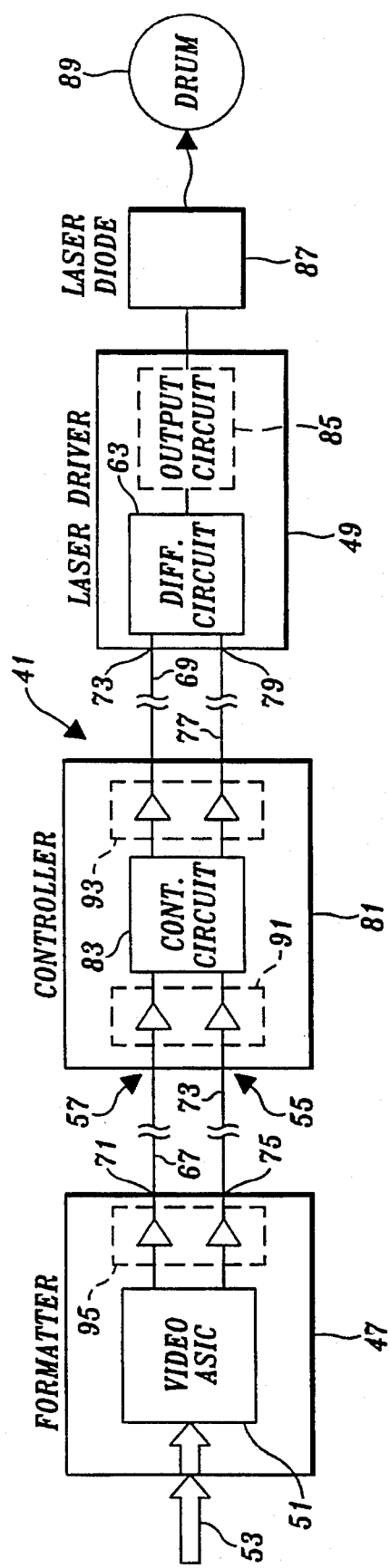

PROPAGATION-DELAY-TRANSPARENT VIDEO-SIGNAL INTERFACE

FIELD OF THE INVENTION

This invention generally relates to electrical interfaces, and more particularly, to video-signal buffered interfaces for transmitting a video signal in a laser printer from a formatter to a laser driver.

BACKGROUND OF THE INVENTION

Electrophotographic or laser printers are presently common in the office workplace. In basic terms, a laser printer typically includes a formatter, a laser driver, a laser diode and a photosensitive drum. The laser printer generally receives print commands and character and graphic data in digital form from an external computer via a computer interface cable. The formatter processes the character and graphic data to generate a video signal for controlling the laser diode. The video signal is transmitted from the formatter to the laser driver via ribbon cables. Based upon the video signal, the laser driver generates a drive current that energizes the laser diode. In response, the laser diode generates a laser beam that strikes the photosensitive drum to create a charge pattern corresponding to the image to be printed. The charge pattern is then developed and transferred to a print medium, such as paper.

The video signal is a rasterized representation of the image to be printed. The formatter processes the externally received character and graphic data with a process sometimes referred to as bit mapping to break the image down into a matrix of pixels. The matrix of pixels is divided into scan lines, and the pixels are represented serially in each scan line by the video signal. The image is generated using the video signal to process the pixels line-by-line. In a single-tone laser printer, each pixel location is either on or off, i.e., either dark or light. The video signal typically comprises a train of pulses indicating whether each of the pixel locations is dark or light. More specifically, each pixel location is represented by a particular portion of the video signal. For example, 100 nanoseconds of the video signal could be dedicated to each pixel location. Whether the pixel should be dark or light is represented by the voltage level of the video signal. For example, each dark pixel could be represented by a high voltage level and each light pixel could be represented by a low voltage level. Then, if a particular pixel location should be dark, the portion of the video signal corresponding to that pixel would contain a high voltage level pulse that would activate the laser diode.

Recently, gray-scale laser printers have been introduced, making it possible to represent shades of color in an image produced by the laser printer. One way of representing the shade of gray at a particular pixel location is by varying the width of the pulse within the portion of the video signal dedicated to the pixel location. For example, no pulse could represent white, i.e., no color, and pulses of increasing width could represent darker shades of gray. In essence, in this manner, a gray-scale video signal is achieved by the use of pulse-width modulation. Because different pulse widths represent different shades of gray, it is important that the pulse width received by the laser driver be nearly the same as the pulse width originally generated by the formatter.

Various factors can affect the intended pulse width in the signal received by the laser driver, including the type of conductor used to convey the signal from the formatter. Transmitting the video signal from the formatter over ribbon cables to the laser driver can distort the widths of the pulses so that the image is corrupted, i.e., pixel locations are darker or lighter than intended. The sensitivity to pulse width distortion increases as the number of shades in the gray scale is increased because the difference between the pulse width representing one shade and the pulse width representing the next shade decreases. Sensitivity is further increased as the video signal is shortened in time to increase the speed of the laser printer. That is, as each pixel is represented by a smaller portion of the video signal, the sensitivity to variations in pulse width increases.

Unfortunately, interfaces currently used to interconnect a formatter and laser driver do indeed distort the video signal, including distortion of the pulse widths. A ribbon cable typically interconnects the output of the formatter to the input of the controller, and the output of the controller is typically connected to the input of the laser driver with a second ribbon cable. The controller may include test functions for testing the integrity of a video signal during test operations. Buffers, e.g., digital gates such as an AND gate, are often included in the formatter output section and in the controller, to drive the video signal across the ribbon cables. Without these buffers, the video signal quality would deteriorate over the length of the ribbon cables to an unacceptable level. For example, the edges of pulses would begin to "flatten" out as the signal propagated over the ribbon cables. The signal source output impedance takes time to charge the capacitive load of the ribbon cable transmission line. In essence, a buffer restores or reconditions the signal received at its input. For example, if the pulse arriving at the input of a buffer has sloping edges, the output amplification of the buffer generates a nearly square pulse with vertical edges. Thus, to avoid deterioration of pulses, the signal path from the formatter to the laser driver includes a series of buffers.

Unfortunately, the use of series connected buffers creates another problem. Generally, the rise and fall times of a particular buffer are not the same (especially over voltage, temperature, and buffer process variations), causing the width of a pulse to become distorted, i.e., shortened or widened, upon passing through the buffer. As the video signal passes through a series of buffers, this problem is magnified. The pulse width distortion can increase to the point that the pulse arriving at the laser driver represents a darkness several shades different from that originally transmitted. As a result, the resulting image is inaccurate. In addition to the buffers distorting the video signal, electromagnetic noise within the laser printer can create cross-talk on the video-signal interface that further corrupts the video signal.

The present invention provides a new video-signal interface that addresses these and other problems, by substantially cancelling the distortion caused by buffers and electromagnetic noise.

SUMMARY OF THE INVENTION

In accordance with this invention, a propagation-delay-transparent, video-signal interface suitable for use in a laser printer to carry a video signal from a formatter to a laser driver with minimal distortion from electromagnetic noise and differences between the rising-edge and falling-edge delay times of buffers in the interface is provided. Prior art video-signal interfaces have used a single wire or other comparable transmission medium for carrying a video signal. In contrast, the present invention utilizes a differential hysteresis approach. The video-signal interface includes two transmission wires so as to provide two transmission paths from a formatter to a laser driver. The formatter, which generates a video signal, includes a phase aligned inverter to generate a complement, i.e., an inverted form of the video signal. The original video signal is transmitted on one of the transmission wires and the inverted video signal, i.e., the complement, is transmitted on the other transmission wire. The laser driver includes a differential amplifier that receives the signals on both of the transmission wires, and forms a drive signal based upon the difference between these received signals. The drive signal produced by a specially modified differential amplifier is then used to drive a laser diode. As is well known in the prior art, the use of a differential technique eliminates common-mode noise generated on the transmission wires by electromagnetic noise.

In accordance with further aspects of this invention, the interface is in digital form, as opposed to analog form (thus being more economical than an analog differential amplifier), and is used to transmit digital signals. The video signal produced by a typical formatter is a digital waveform, i.e., the video signal alternates between two extreme values to form a train of pulses representing a series of on and off states. The inverter included in the formatter is a digital component that generates the complement of the video signal. The interface includes digital buffers that maintain and restore the video signal and its complement to one of the two extreme values so as to be acceptable for receiving digital circuitry.

In accordance with further aspects of this invention, the buffers included in the video-signal interface are grouped in pairs with each pair being formed on a single substrate or die. One of the buffers from each buffer pair is placed in one of the transmission paths and the other buffer is placed in the other transmission path. As a result, the two transmission paths in the interface are very nearly identical because there is very little variation between buffers formed on the same substrate. The voltage, temperature and die lot variations are eliminated this way. Because the two transmission paths are nearly identical, the interface is able to more effectively eliminate common-mode noise.

In accordance with still further aspects of the invention, the digital differential receiver at the laser diode driver circuit includes hysteresis circuitry. Because there is typically a difference between the rising-edge and falling-edge delay times of a buffer, the pulse widths of the video signal are distorted, i.e., widened or narrowed, as the video signal passes through the buffers. Depending on the relative sizes of the rising-edge and falling-edge delay times, e.g., the rising-edge delay time being larger than the falling-edge delay time, the pulse widths of the video signal are either widened or shortened. By selecting a buffer with the same relative delay times, the effect on the video signal's complement is just the opposite. For example, if the pulse widths in the video signal are widened, the pulse widths of the complement signal are narrowed. Thus, use of the differential amplifier to determine the difference between the two received signals does not alone eliminate this distortion. Rather, hysteresis circuitry is included in the differential amplifier to eliminate this problem. The hysteresis circuitry prevents the drive signal from changing from one extreme value to another until both received signals have changed to new extreme values. By combining the differential techniques with hysteresis, a synergistic effect that eliminates pulse width distortion caused by the buffer delay times is achieved.

As will be readily appreciated from the foregoing description, the invention provides a video signal interface suitable for use in laser printers to transmit a video signal that is minimally affected by distortion caused by electromagnetic noise and included buffers having different rising-edge and falling-edge delay times. The video signal interface uses a differential technique that includes parallel signal paths to eliminate the effect of common-mode noise. The interface is used to carry a digital signal having one of two extreme values and includes buffers that restore the signal to one of the extreme values. Furthermore, the buffers used are in pairs formed on a common substrate so that the two transmission paths are very nearly identical. Hysteresis circuitry is used in combination with the differential technique so that the pulse widths of the video signal are not affected by buffers having different rising-edge and falling-edge propagation delays. It will therefore be readily appreciated that the video signal interface produces a signal at its output that is nearly identical to the video signal originally produced by the formatter so that the image produced by the laser printer accurately represents the desired image.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1A is a block diagram showing a typical prior art interface interconnecting a formatter and laser driver in a laser printer;

FIG. 1B is a block diagram showing a simplified form of the prior art interface in FIG. 1 A;

FIG. 2 is a signal diagram illustrating the distortion in the width of a signal pulse caused by the buffer in the simplified interface shown in FIG. 1B;

FIG. 3 is a simplified block diagram of the video-signal interface in accordance with the present invention;

FIG. 4 is a block diagram of a laser printer including the video-signal interface in accordance with the present invention; and FIG. 5 is a signal diagram illustrating how the present invention eliminates pulse width distortion.

DETAILED DESCRIPTION OF THE INVENTION

FIG. 1A is a block diagram representation of a typical prior art laser printer. The laser printer includes a formatter 1, a laser driver 3, a laser diode 5, and a photosensitive drum 7. Typically, an external computer, e.g., a personal computer (not shown), requests the laser printer to print desired images. The formatter 1 receives print commands along with data representing the image from the external computer via an external interface, typically a parallel interface cable. Based upon the data 9 received from the external computer, the formatter 1 generates a video signal, which represents the desired image in a serial, i.e., rasterized form. The video signal is transmitted from the formatter 1 to the laser driver 3 via a video-signal interface 11. As a function of the video signal, the laser driver 3 generates a drive current for exciting the laser diode 5. The laser diode 5 generates a laser beam that strikes the photosensitive drum 7 to create a charge pattern corresponding to the desired image.

More specifically, the formatter 1 includes a video ASIC (Application Specific Integrated Circuit) 13 that generates the video signal based on the externally received data 9; the formatter 1 typically would include digital processors and memory. The video signal produced by the video ASIC 13 is a rasterized representation of the desired image. That is, the image is broken down into a matrix of pixels and the video signal is a serial representation of the pixels. Thus, the formatter 1 maps the externally received character and graphic data 9 into a pixel representation. The video signal typically comprises a train of pulses representing the relative darkness of each pixel location. In a single-tone laser printer, each pixel is either light or dark. According to one common technique, the video signal encodes this information by providing a pulse in the video signal corresponding to a dark pixel, or in an alternative scheme, to a light pixel. In gray-scale laser printers, each pixel can take on varying shades of darkness. One way of encoding this information in the video signal is to vary the width of pulses. For example, a wider pulse could represent a darker shade. Thus, in either single-tone laser printers or gray-scale laser printers using these techniques, the video signal produced by the video ASIC 13 is a train of pulses.

The interface 11 includes two transmission wires 17 and 19 and a controller 21. The video signal generated by the formatter 1 is applied to a buffer 15 before being output on the transmission wire 17. The buffer 15 is used to provide sufficient drive capability to drive the video signal across the interface 11. The video signal supplied by the buffer 15 is serially carried over the first transmission wire 17, through the controller 21, and over the second transmission wire 19 to the laser driver 3. The controller 21 generally includes controller circuitry 23 through which the video signal passes. The controller circuitry 23 is typically used to manage the printer paper handling motors and sensors and also to provide test functions for the video interface. The controller 21 also generally includes at least two buffers 25 and 27 for restoring the shape of the video signal before entering the controller circuitry 23 and upon exiting the controller circuitry 23. Due to impedances on the transmission wires 17 and 19 and the controller circuitry 23, the video signal tends to deteriorate as it propagates across the interface 11. The buffers, such as buffers 15, 25, and 27 tend to restore the video signal. The buffers are digital devices that output either a high or low voltage representing a logic 1 or 0. The voltage levels correspond to those required by digital components, e.g., either TTL or CMOS levels. While the signal at the input of a buffer may vary from the logic voltage levels, the buffer restores the input waveform to the proper voltage levels. Furthermore, the buffers provide sufficient drive capacity to sustain the video signal despite the load imposed by the interface and the receiving circuitry.

In addition to deterioration caused by the impedance along the interface 11, the video signal is distorted by electromagnetic interference. The video-signal interface 11 is exposed to electromagnetic noise generated by various components within the laser printer as well as external sources of electromagnetic radiation. The transmission wires 17 and 19 tend to pick up a portion of this electromagnetic interference, which distorts the video signal as it propagates across the interface 11.

Another significant source of distortion is the buffers along the transmission path from the formatter to the laser driver. Buffers are unfortunately not perfect devices and have propagation delays. The output of a digital buffer is high, low, or transitioning between a high and low level. The transition from a low to high level is referred to as a rising-edge and the transition from a high to low level is referred to as a falling-edge. The rising-edge and falling-edge transitions of a signal are delayed upon passing through a buffer. Generally, the rising-edge propagation delay is not the same as the falling-edge propagation delay. As will be illustrated with reference to FIG. 1B and FIG. 2, this difference in propagation delay results in the pulse widths being either widened or narrowed.

FIG. 1B is a simplified version of the interface 11 in FIG. 1A that is useful to illustrate the distortion caused by buffers. The simplified interface 11 in FIG. 1B includes the two transmission wires 17 and 19 connected in series with a single buffer 29. FIG. 2 is a signal diagram illustrating the distortion of a pulse 30 as it passes through the buffer 29. The waveform $A_1$ in FIG. 2 represents a portion of the video signal generated by the formatter 1 and applied to the transmission wire 17. The waveform $A_1$ represents the voltage produced by the formatter as time passes. The signal $A_1$ alternates between two extreme voltage levels, i.e., a high and low value, so that pulses are formed e.g., the active low pulse in waveform $A_1$. The width of the pulse 30 in the waveform $A_1$ is $t_{input}$. The waveform $A_2$ represents the resulting signal at the output of the buffer 29. The buffer 29 has a particular falling-edge propagation delay $t_{hl}$ and a rising-edge propagation delay $t_{lh}$ which are nearly always significantly different for most buffers. The falling-edge propagation delay represents the time it takes the output of the buffer 29 to go low after the input of the buffer 29 has gone low. Similarly, the rising-edge propagation delay $t_{lh}$ represents the time it takes the output of the buffer to go high after the input of the buffer has gone high. In the example illustrated in FIG. 2, the rising-edge propagation delay $t_{lh}$ is greater than the falling-edge propagation delay $t_{hl}$. FIG. 2 illustrates how the difference between the propagation delays changes the width of the pulse 30 originally generated by the formatter 1. Because the rising-edge propagation delay $t_{lh}$ is greater than the falling-edge propagation delay $t_{hl}$, the width of the pulse 30' in waveform $A_2$ is greater than the width of the pulse 30 in waveform $A_l$, i.e., the output pulse width $t_{out}$ is greater than the input pulse width $t_{input}$. On the other hand, if the falling-edge propagation delay $t_{hl}$ is greater than the rising-edge propagation delay $t_{lh}$, the pulse shown in FIG. 2 would be narrowed upon passing through the buffer 29. If the rising-edge and falling-edge propagation delays were the same, the pulse would only be shifted but would not be widened or narrowed.

The distortion of the pulse widths caused by buffers is particularly significant because there are multiple, typically four to five, buffers in the interface 11. The relative sizes of the rising-edge and falling-edge propagation delays from one buffer to another are generally the same, e.g., the rising-edge propagation delay is larger than the falling-edge propagation delay for each buffer. Thus, if a pulse width is increased (as in FIG. 2) upon passing through a single buffer 29, the pulse width is further increased upon passing through additional buffers such as buffers 15, 25 and 27 shown in FIG. 1A. As a result, the width of a pulse transmitted over the interface 11 can be significantly altered by the time the pulse reaches the laser driver 3. This change in pulse width can cause a significant deterioration in the quality of the image produced by the laser printer, particularly in gray-scale laser printers in which the pulse width is used to indicate the tone of gray of a particular pixel. Any change in pulse width causes the resulting shade of a pixel to be darker or lighter than that desired. In addition, this distortion of pulse width can be aggravated by supply voltage, temperature, and die lot variations.

The present invention solves this problem with a dual-path interface 41 as shown in FIG. 3. FIG. 3 is a simplified block diagram in that the interface 41 only shows two buffers 43 and 45. FIG. 4 is a block diagram representation of the invention as it will preferably be implemented in an actual laser printer. The simplified form of the interface 41 shown in FIG. 3 interconnects the formatter 47 and the laser driver 49. The formatter includes a video ASIC 51 that generates a video signal based upon external data 53 received from a computer requesting an image to be printed. The interface includes dual transmission paths 55 and 57. The upper transmission path 57 carries the original video signal generated by the formatter board 51 and the lower transmission path 55 carries the complement of the video signal. As illustrated, the original video signal is generated at line 58 in the formatter. The video board 51 includes an inverter 59 for generating the complement of the video signal at line 60 in the formatter, and the signals carried by the upper and lower transmission paths 57 and 55 are applied to a differential circuit 63 that is included in the laser driver 49.

More specifically, the video signal produced by the video ASIC 51 is supplied to an output 71 of the formatter for transmission over the upper transmission path 57. The output of the inverter 59, i.e., the complement of the video signal, is supplied to an output 75 of tile formatter for transmission over the lower transmission path 55. This inverter is phase matched to the buffer 99 on the video ASIC. The upper transmission path 57 includes two transmission wires 67 and 69 and the buffer 43 connected in series. The transmission wire 67 connects the output 71 of the formatter to the input of the buffer 43, and the transmission wire 69 connects the output of the buffer 43 to a first input 73 of the laser driver 49. Similarly, in the lower transmission path 55, a transmission wire 74 connects the second output 75 of the formatter to the input of the buffer 45, and a transmission wire 77 connects the output of the buffer 45 to a second input 79 of the laser driver 49.

In accordance with the invention, the laser driver 49 includes a differential circuit 63 that provides hysteresis. In FIG. 3, the differential circuit 63 is illustrated as comprising a separate differential amplifier 61 and a hysteresis circuit 65. The video signal carried by tile upper transmission path 57 and its complement carried by the lower transmission path 55 are applied at the positive and negative inputs of the differential amplifier 61 via the laser driver inputs 73 and 79. The differential amplifier 61 forms the difference between these two received signals and applies the result to the input 80 of the hysteresis circuit 65. Because the differential amplifier 61 produces the difference between the signals carried by the upper and lower transmission paths 57 and 55, any common-mode noise produced on the transmission paths is canceled out. For example, electromagnetic noise surrounding the interlace 41 produces nearly identical noise on both the upper and lower transmission paths 57 and 55. As a result, electromagnetic noise is common to both the transmission paths. The differential amplifier 61 cancels out such common-mode noise.

While the differential amplifier 61 eliminates common-mode noise, pulse width distortion caused by the buffers in the transmission paths is not eliminated by the differential amplifier 61, as illustrated by the waveforms shown in FIG. 5, because the buffers affect the original video signal and its complement in an opposite fashion. In FIG. 5, the waveform $A_1$ represents a portion of the original video signal supplied at the output 71 of the formatter, and the waveform $B_1$ represents the complement of the video signal supplied at the output 75. The waveforms $A_2$ and $B_2$ respectively represent the signals produced at the outputs of the buffers 43 and 45. As shown in FIG. 5, the waveforms are based upon the assumption that the rising-edge propagation delay $t_{lh}$ is the same for both buffers, and the falling-edge propagation delay $t_{hl}$ is the same for both buffers 43 and 45 ($t_{lh}$ and $t_{hl}$ generally not being equal) with the rising-edge propagation delay $t_{lh}$ being larger. Furthermore, any distortion in the video signal and its complement due to electromagnetic noise or other sources is not relevant for purposes of explaining how the present invention eliminates pulse-width distortion due to buffer propagation delays.

The buffers 43 and 45 affect the video signal and its complement in opposite ways. Pulses in the video signal are active low as indicated by waveforms $A_1$ and $A_2$. In contrast, the complement of the video signal has active high pulses, as illustrated by the waveform $B_1$. The buffer 43 causes a pulse in the video signal to widen as shown by the waveform $A_2$. On the other hand, the waveform $B_2$ shows that the buffer 45 causes a pulse width in the complement signal to narrow. That is, while the buffer 43 causes the pulse in the video signal to widen, the buffer 45 causes the pulse of the complement signal to narrow. The waveform C represents the signal produced by the differential amplifier 61, i.e., the difference between the waveforms $A_2$ and $B_2$, possibly in amplified form. The active low pulse in the signal C has an intermediate step (i.e., level) at its falling and rising edges. Including the intermediate steps, the overall width of the pulse in the signal C is the same as the width of the pulse in the waveform $A_2$, which is larger than the pulse in the original video signal $A_1$. It is thus evident that tile differential amplifier 61 alone does not eliminate the pulse-width distortion caused by the buffers.

In accordance with further aspects of this invention, the output of the differential amplifier 61 is processed by the hysteresis circuit 65. Through the combination of the differential amplifier 61 and the hysteresis circuit 65 a synergistic effect is realized that restores the pulse width to its original width as shown by waveform D. That is, the input pulse width $t_{input}$ is equivalent to the output pulse width $t_{out}$ in signal D produced by the hysteresis circuit 65. The operation of the hysteresis circuit is such that the output produced thereby is at one of two extreme levels, i.e., either at a high level or a low level, and the hysteresis circuit output does not change from these levels until the output of the differential amplifier 61 reaches a similar extreme. More particularly, the output of the hysteresis circuit does not change while the output of the differential amplifier 61 is at an intermediate value, i.e., the output of the hysteresis circuit maintains the value previously defined. In other words, the output of the hysteresis circuit 65 does not change from one extreme value to the other until the video signal received at input 73 and its complement received at input 79 have both transitioned to a new extreme level. In FIG. 3, the hysteresis circuit 65 is shown as receiving the signals at the inputs 73 and 79 via the connection 84. Use of these signals is one way to accomplish the hysteresis function, but other circuitry could be used for this purpose, as will be readily recognized by those skilled in the electronics art.

In summary, use of the dual transmission paths 57 and 55 and the differential amplifier 61 eliminates the effect of common-mode noise. In addition, combining the dual transmission paths and the differential amplifier 61 with the hysteresis circuit 65 eliminates the pulse width distortion caused by buffers in the interface 41.

As previously mentioned, FIG. 3 is a simplified form of the invention. An interlace formed in accordance with the invention is preferably implemented as shown in FIG. 4. The interface 41 shown in FIG. 4 includes a controller 81 that contains controller circuitry 83, typically for managing the printer paper handling motors and sensors. It also provides test functions for the video interface. The laser driver 49 includes the differential circuit with hysteresis 63; for simplicity, the differential amplifier 61 and hysteresis circuit 65 illustrated in FIG. 3 are not shown individually. The laser driver 49 can optionally include an output circuit 85. For example, if the output produced by the differential circuit 63 is a voltage waveform, the output circuit 85 could produce a corresponding current waveform for driving the laser diode. The output of the differential circuit 63 is applied to the output circuit 85, the output of which is applied to the laser diode 87. In turn, the laser diode excites the photosensitive drum 89 to produce the desired image.

The interface 41 includes two pairs of buffers 91 and 93 in the controller 81 and a third pair of buffers 95 in the formatter 47. One of the buffers from each of the pairs 91, 93, and 95 is placed in the upper transmission path 57 and the other buffers are placed in the lower transmission path 55. As previously mentioned, the waveforms shown in FIG. 5 are based upon the assumption that the rising-edge propagation delays of the two buffers 43 and 45 in FIG. 3 are identical and the failing-edge propagation delays of the two buffers 43 and 45 are also identical. If this assumption is not true, the synergistic effect produced by the combination of the differential amplifier 61 and the hysteresis circuit 65 will not fully eliminate pulse width distortion caused by propagation delays. This assumption is in fact generally not true for different buffers, i.e., buffers in different packages, since the rising-edge and failing-edge propagation delays differ from one package to another.

However, if the buffers are formed in accordance with the present invention, this assumption is realized. As shown in FIG. 4, the buffers are grouped in buffer pairs 91, 93, and 95. If, in accordance with the present invention, the buffers of a particular buffer pair are formed on the same substrate or die, using presently available semiconductor manufacturing techniques, the buffer pair will have nearly identical propagation delays. Furthermore, the variation in the propagation delays due to voltage and temperature will be identical for a given buffer pair. By placing one buffer of each buffer pair in the upper transmission path 57 and the other buffer in the lower transmission path, the transmission paths are very nearly identical. Accordingly, the rising-edge propagation delays in the upper and lower transmission paths are the same and the falling-edge propagation delays in the two transmission paths are also the same.

The specific interconnection of the buffer pairs and other components in the video-signal interface 41 shown in FIG. 4 are as follows. The buffer pair 95 preferably is included in the formatter 47. The video signal produced by the video board 51 is applied to the input of one buffer of the buffer pair 95 and the complement of the video signal is supplied to the other buffer. For simplicity, the inverter illustrated in FIG. 3 is not shown in the video board 51 in FIG. 4. The outputs of tile buffers in the buffer pair 95 are supplied at tile outputs 71 and 75 of the formatter, which are in turn, carried over the transmission wires 67 and 73 to the controller 81. The controller 81 preferably houses the buffer pairs 91 and 93. The buffers of the buffer pair 91 respectively receive the signals on the transmission wires 67 and 73. The outputs of the buffer pair 91 are applied to the inputs of the controller circuit 83. The outputs of the controller circuit 83 are respectively applied to the inputs of the buffers of tile buffer pair 93. The outputs of the buffer pair 93 are supplied at the outputs of the controller, which are connected to the transmission wires 69 and 77, respectively. The signals carried by the transmission wires 69 and 77 are respectively supplied to the inputs of the laser driver 73 and 79, which are connected to the inputs of the differential circuit 63. The differential circuit 63 performs the differential and hysteresis operations and the result is supplied to the output circuit 85. Finally, the output of the output circuit 85 is applied to the laser diode 87. While the invention has been described in block diagram form, it will be readily appreciated by those skilled in the electronics art that the functional blocks illustrated are readily implemented with presently available circuitry and techniques.

While the preferred embodiment of the invention has been illustrated and described, it will be appreciated that various changes can be made therein without departing from the spirit and scope of the invention. For example, while the differential circuit 63 was illustrated as including an individual differential amplifier 61 and a hysteresis circuit 65, a single circuit could be used to perform both operations. Furthermore, the video-signal inter/ace could include more or less buffers than illustrated. Still further, while the invention was described with reference to a laser printer, the interface provided by the present invention could readily be used to carry pulse waveforms with little or no distortion in other forms of printers as well as in other environments. Generally, the interface could be used to carry a digital waveform from one digital circuit to another digital circuit. Consequently, within the scope of the appended claims, it is to be understood that the invention can be practiced otherwise than as specifically described herein.

The embodiments of the invention in which an exclusive property or privilege is claimed are defined as follows.

What is claimed is:

1. An electrical interface for carrying a digital signal from a first digital circuitry to a second digital circuitry with low distortion, said electrical interface comprising:

an inverter, coupled to receive the digital signal from the first digital circuitry, the digital signal having on and off states, said inverter generating an inverted digital signal that is a complement of the digital signal and is phase aligned to the digital signal;

a first conductor having a first end and a second end, said first end being coupled to the first digital circuitry to receive the digital signal;

a second conductor having a first end and a second end, said first end being coupled to said inverter to receive the inverted digital signal; and a differential amplifier, coupled to the second ends of said first conductor and said second conductor, said differential amplifier forming an output digital signal based on a difference between a first signal received from said first conductor and a second signal received from said second conductor, where said first signal is the digital signal with any distortion that has occurred during propagation over the first conductor and said second signal is the inverted digital signal with any distortion that has occurred during propagation over the second conductor, whereby the output digital signal, when compared to the digital signal from the first digital circuitry, is substantially free of distortion.

2. The electrical interface of claim 1, wherein a third conductor having a first end and a second end, said first end being coupled to said differential amplifier to receive said output digital signal, said second end being coupled to a hysteresis circuitry such that a change in the first signal received from said first conductor from one state to another, or a change in the second signal received from said second conductor from one state to another does not affect the output digital signal from the hysteresis circuitry until the first signal received from said first conductor has changed from one state to another and the second signal received from said second conductor has changed from one state to another.

3. The electrical interface of claim 2, further comprising:

a first buffer being semiconductor formed on a substrate, having an input and an output, the first buffer connected in series within said first conductor before said differential amplifier, for receiving at said input of said first buffer the digital signal carried on said first conductor, re-conditioning the digital signal, and applying the digital onto said conductor via said output of said first buffer; and a second buffer, having an input and an output, second buffer connected in series within said second conductor between said inverter and said differential amplifier, for receiving at said input of said second buffer the inverted digital signal carried on said second conductor, re-conditioning the inverted digital signal, and applying the inverted digital signal onto said second conductor via said output of said second buffer, wherein said second buffer is a semiconductor formed on said substrate on which said first buffer is formed, whereby said first buffer and said second buffer have similar operating characteristics.

4. The electrical interface of claim 3, wherein the first digital circuitry comprises a formatter and the digital signal is a video signal, and wherein the second digital circuitry comprises a printer driver that drives an imaging source based upon the video signal so as to create a desired printed image, said electrical interface serving to transmit the video signal from the formatter to the driver without introducing distortion.

5. An electrical interface for carrying a pair of signals from a first electronic module to a second electronic module with low distortion, said electrical interface comprising:

a first transmission medium for receiving and carrying an initial first signal, the first transmission medium having an input end and an output end, said input end being coupled to said first electronic module, the initial first signal being generated by the first electronic module;

a first buffer, being a semiconductor formed on a substrate, having an input and output, the first buffer connected in series within said first transmission medium, between the input end and the output end of said first transmission medium, for receiving at said input of said first buffer the initial first signal carried on said first transmission medium, re-conditioning the initial first signal, and applying the initial first signal onto said first transmission medium via said output of said first buffer;

a second transmission medium for receiving and carrying an initial second signal, the second transmission medium having an input end and an output end, said input end being coupled to said first electronic module, the initial second signal being generated by the first electronic module; and a second buffer, having an input and an output, the second buffer connected in series within said second transmission medium, between the input end and the output end of said second transmission medium, for receiving at said input of said second buffer the initial second signal carried on said second transmission medium, re-conditioning the initial second signal, and applying the initial second signal onto said second transmission medium via said output of said second buffer, wherein said second buffer is a semiconductor formed on said substrate on which said first buffer is formed, whereby said first buffer and said second buffer have similar operating characteristics so as to avoid causing differences in the signals conveyed over the first transmission medium and the second transmission medium.

6. The electrical interface of claim 5, further comprising an inverter, coupled to receive the first initial signal from the first electronic module, the first initial signal having on and off states, said inverter generating an inverted signal that is a complement of the first signal and is phase aligned to the first signal, the inverted signal being the initial second signal.

7. The electrical interface of claim 6, further comprising a differential amplifier, coupled to the second ends of said first transmission medium and said second transmission medium, said differential amplifier forming an output signal based on a difference between a first signal received from the first transmission medium and a second signal received from the second transmission medium, wherein said first signal is the initial first signal with any distortion that has occurred during propagation over the first transmission medium and said second signal is the initial second signal with any distortion that has occurred during propagation over the second transmission medium, wherein the output signal from the differential amplifier is substantially free of distortion, compared to the initial first signal from the first electronic module.

8. The electrical interface of claim 7, wherein the first electronic module comprises a formatter and the initial first signal is a video signal, and wherein the second electronic module comprises a printer driver that drives an imaging source based upon the video signal so as to create a desired printed image, said electronic interface serving to transmit the video signal from the formatter to the printer driver without introducing distortion.

9. An electrical interface having a first electronic module and a second electronic module, the electronic interface for carrying a pulse waveform signal, the pulse waveform signal having two different levels, from the first electronic module to the second electronic module, without introducing distortion in the pulse waveform signal due to signal delays, said electrical interface comprising:

an inverter, coupled to receive an initial first signal generated by the first electronic module, the initial first signal being the pulse waveform signal having two different levels, said inverter generating an initial second signal that is an inverted complementary form of the initial first signal and phase aligned to said initial first signal;

a first transmission medium for carrying the initial first signal; the first transmission medium having an input end and an output end, said input end being coupled to the first electronic module to receive the initial first signal being generated by the first electronic module;

a second transmission medium for carrying the initial second signal, the second transmission medium having an input end and an output end, said input end being coupled to said inverter to receive the second signal being generated by the inverter; and a differential amplifier, coupled to said first transmission medium and said second transmission medium at the second ends of said first transmission medium and said second transmission medium, the differential amplifier forming an output signal based on a difference between the initial first signal, with any distortion, received from said first transmission medium and the initial second signal, with any distortion, received from said second transmission medium, said differential amplifier including a hysteresis circuitry such that a change in the initial first signal, with any distortion, from one level to a different level or a change in the initial second signal, with any distortion, from one level to a different level does not affect the output signal from the differential amplifier, until both the initial first signal, with any distortion, and the initial second signal, with any distortion, have changed from one level to the different level to compensate for differences in propagation time for the initial first signal and the initial second signal through the first transmission medium and the second transmission medium respectively.

10. The electrical interface of claim 9, wherein the first electronic module comprises a formatter and the initial first signal generated by the formatter is a video signal, and wherein the second electronic module comprises a printer driver that drives an imaging source based upon the video signal so as to create a desired printed image, said electrical interface serving to transmit the video signal from the formatter to the printer driver.

11. An electrical interface for a printer having formatter circuitry that generates a video signal and printer driver circuitry that drives an imaging source based upon the video signal so as to create a desired image, said electrical interface minimizing distortion in the video signal supplied to said printer driver circuitry, said electrical interface comprising:

an inverter, coupled to the formatter circuitry to receive the video signal generated by the formatter circuitry, for generating an inverted form of the video signal;

a first transmission medium, coupled to the formatter to receive the video signal, for carrying the video signal over a first path;

a second transmission medium, coupled to said inverter to receive the inverted form of the video signal, for carrying the inverted form of the video signal over a second path; and a differential amplifier, coupled to said first transmission medium and said second transmission medium at the ends of the first and second paths, to receive signals carried thereon, for generating a drive signal based on a difference between the signal received from said first transmission medium and the signal received from said second transmission medium.

12. The electrical interface of claim 11, wherein the video signal comprises a pulse waveform signal having on and off states.

13. The electrical interface of claim 11, wherein said first transmission medium includes a first buffer having an input and an output, said input of said first buffer receiving the signal carried on said first transmission medium, said first buffer re-conditioning the received signal and applying a re-conditioned signal onto said first transmission medium via said output of said first buffer, said first buffer comprising a semiconductor formed on a substrate; and where said second transmission medium includes a second buffer having an input and an output, said input of said second buffer receiving the signal carried on said second transmission medium, said second buffer re-conditioning the received signal and applying a re-conditioned signal onto said second transmission medium via said output of said second buffer, wherein said second buffer comprises a semiconductor formed on said substrate on which said semiconductor of the first buffer is formed, whereby said first and second buffers have substantially similar operating characteristics so that they do not introduce differences in the signals propagating through the first and the second transmission media.

14. The electrical interface of claim 13, wherein the video signal comprises a pulse waveform signal having two levels representing on and off states.

15. The electrical interface of claim 14, wherein the printer comprises a laser printer and the imaging source comprises a laser source.

16. An electrical interface for use in a printer having a formatter that generates a video signal comprising a series of pulses and a driver that drives an imaging source based upon the video signal so as to create a desired image, said electrical interface serving to transmit the video signal from the formatter to the driver without introducing distortion, said electrical interface comprising:

an inverter, coupled to the formatter to receive the video signal comprising a series of pulses generated by the formatter, the video signal having two different levels representing on and off states, said inverter generating a complement of the video signal;

a first transmission medium, coupled to the formatter to receive the video signal in order to convey the video signal to the driver;

first buffer means, coupled inline with said first transmission medium, for receiving the video signal carried on said first transmission medium, re-conditioning the video signal, and applying the video signal onto said first transmission medium for transmission to the driver, wherein said first buffer means comprises a semiconductor formed on a substrate;

a second transmission medium, coupled to said inverter to receive the complement of the video signal, for carrying the complement of the video signal;

second buffer means, coupled inline with said second transmission medium, for receiving the video signal carried on said second transmission medium, re-conditioning the video signal, and applying the video signal onto said second transmission medium, wherein said second buffer means comprises a semiconductor formed on said substrate on which said semiconductor comprising said first buffer means is formed, whereby said first buffer and said second buffer means have similar rising edge and falling edge delay times; and differential amplifier means, coupled to the driver and coupled to said first transmission medium and said second transmission medium to receive signals carried thereon from the formatter and from the inverter, respectively, for forming a drive signal based on a difference between the video signal received from said first transmission medium and the video signal received from said second transmission medium, said differential amplifier including a hysteresis means such that a change in the video signal received from said first transmission medium from one level to the other different level or a change in the video signal received from said second transmission medium from one level to the other different level does not affect the drive signal until the signal received from said first transmission medium has changed from one level to the other different level and the signal received from said second transmission medium has changed from one level to the other different level, whereby pulse widths of the drive signal are substantially similar to pulse widths of the video signal generated by the formatter.

* * * * *